United States Patent
Nickerson et al.

(10) Patent No.: US 6,864,990 B1
(45) Date of Patent: Mar. 8, 2005

(54) METHOD AND MACHINE FOR PREPARING AND DISPENSING DOCUMENTS

(75) Inventors: John M. Nickerson, Santa Ana, CA (US); Bradley W. Hauser, Huntington Beach, CA (US); Michael E. Baldwin, Lake Elsinore, CA (US)

(73) Assignee: Continental Express Money Order Company, Inc., Santa Ana, CA (US)

( * ) Notice: Subject to any disclaimer, the term of this patent is extended or adjusted under 35 U.S.C. 154(b) by 0 days.

(21) Appl. No.: 09/401,857

(22) Filed: Sep. 22, 1999

(51) Int. Cl.[7] ............................................. G06F 15/00
(52) U.S. Cl. ..................... 358/1.15; 382/135; 382/138; 382/139
(58) Field of Search ........................ 358/1.15; 382/135, 382/137, 138, 139, 140; 235/475, 476

(56) References Cited

U.S. PATENT DOCUMENTS

| | | |
|---|---|---|
| 3,814,227 A | 6/1974 | Hurd, III et al. |
| 3,848,798 A | 11/1974 | Riley |
| 3,970,992 A | 7/1976 | Boothroyd et al. |
| 3,984,660 A | 10/1976 | Oka et al. |
| 3,997,763 A | 12/1976 | Schasser |
| 4,025,905 A | 5/1977 | Gorgens |
| 4,035,792 A | 7/1977 | Price et al. |
| 4,053,735 A | 10/1977 | Foudos |
| 4,082,945 A | 4/1978 | van de Goor et al. |
| 4,175,694 A | 11/1979 | Donabin |
| 4,225,779 A | 9/1980 | Sano et al. |
| 4,266,121 A | 5/1981 | Hirose |
| 4,270,042 A | 5/1981 | Case |
| 4,317,028 A | 2/1982 | Simjian |
| 4,341,951 A | 7/1982 | Benton |
| 4,355,369 A | 10/1982 | Garvin |
| 4,385,285 A | 5/1983 | Horst et al. |
| 4,417,137 A | 11/1983 | Lundblad |
| 4,625,275 A | 11/1986 | Smith |
| 4,699,531 A | 10/1987 | Ulinski, Sr. et al. |
| 4,699,532 A | 10/1987 | Smith |
| 4,812,986 A | 3/1989 | Smith |
| 4,870,596 A | 9/1989 | Smith |
| 4,894,784 A | 1/1990 | Smith |
| 5,014,212 A | 5/1991 | Smith |
| 5,021,967 A | 6/1991 | Smith |
| 5,119,293 A * | 6/1992 | Hammond .................. 364/401 |
| 5,243,174 A | 9/1993 | Veeneman et al. |
| 5,369,709 A | 11/1994 | Foreman et al. |
| 5,377,271 A | 12/1994 | Foreman et al. |
| 5,477,037 A | 12/1995 | Berger |
| 5,492,423 A | 2/1996 | Smith |
| 5,570,465 A | 10/1996 | Tsakanikas |
| 5,570,960 A | 11/1996 | Smith |
| 5,594,226 A | 1/1997 | Steger |
| 5,647,677 A | 7/1997 | Smith |
| 5,667,315 A | 9/1997 | Smith |
| 5,678,937 A | 10/1997 | Smith |
| 5,686,713 A | 11/1997 | Rivera |
| 5,781,708 A | 7/1998 | Austin et al. |
| 6,293,469 B1 * | 9/2001 | Masson et al. ............. 235/476 |

FOREIGN PATENT DOCUMENTS

| | | |
|---|---|---|
| EP | 0883082 A2 | 9/1996 |
| WO | WO9814901 | 9/1998 |

* cited by examiner

Primary Examiner—Mark Wallerson
(74) Attorney, Agent, or Firm—Pillsbury Winthrop LLP

(57) ABSTRACT

A method and machine for preparing and dispensing documents relating to financial transactions. The machine contains an ink jet printer for printing the documents and a bar code reader mounted for movement with the print head of the printer for reading bar codes on each document before or during printing. The machine includes a control unit having personal computer architecture including a CPU, memories and input/output devices. One of the devices is a modem allowing communication with a remote supervisory location. Operation of the machine is controlled from the remote supervisory location, which provides periodic authorization to continue to prepare and dispense documents in response to transaction reports transmitted from the machine to the remote supervisory location. A wide variety of documents can be prepared and dispensed under control of software in the control unit.

20 Claims, 7 Drawing Sheets

METHOD AND MACHINE FOR PREPARING AND DISPENSING DOCUMENTS

BACKGROUND OF THE INVENTION

The present invention relates to machines for preparing and dispensing documents relating to financial transactions, such as money orders. A variety of machines of this type have already been proposed or are in use.

These machines possess a number of inherent limitations. Among these limitations are the inability to be efficiently supervised and controlled from a location remote from the machine, the inability of such machine to except various forms of payment, limitations relating to the nature and form of the data, text and graphics that can be printed, and the limited ability of these machines to monitor their own operation.

In addition, the machines that have already been proposed or are in use are capable of preparing only a single type of document and cannot be adapted to the preparation of other types of documents.

BRIEF SUMMARY OF THE INVENTION

A primary object of the present invention is to open the possibility of preparing and dispensing documents, and in particular documents having monetary value, from any desired point-of-sale location, with a high degree of security.

Another object of the invention is to provide flexibility in the types of documents that can be dispensed from a single machine.

A further object of the invention is to improve communications between a machine in which such documents are prepared and dispensed and a central location remote from the machine, and in particular to allow transmission, from the machine to the central location, of information relating to documents that have been dispensed, and from the central location to the machine of authorization instructions to continue preparing and dispensing such documents.

Still another object of the invention is to allow such a machine to be configured to produce various types of documents.

Still another object of the invention is to allow the purchase of such documents to be electronically debited to, for example, credit or debit accounts by the use of credit, debit, or "smart" cards.

The above another object are achieved, according to the present invention, by the provision of a machine for preparing and dispensing documents relating to financial transactions, the machine being composed of:
  a manually operable input unit for input of data and operating commands;
  a document printer unit for printing readable information on document forms based on data inputted at the input unit, the document printer unit comprising
    a document form storage receptacle for holding the document forms prior to being printed,
    an ink jet printer for printing the readable information on the document forms to produce completed documents, and
    a feed mechanism for feeding the document forms in succession from the receptacle to the printer and for dispensing printed documents from the machine after having been printed by the printer; and
  a control unit coupled to the input unit and the printer unit for controlling operation of the printer unit in response to data and commands inputted at the input unit.

Objects of the invention are further achieved by a method for preparing and dispensing documents relating to financial transactions, the method comprising:
  inputting data and operating commands via a manually operable input unit;
  providing a plurality of document forms each printed with a bar code;
  feeding a succession of document forms from a document storage receptacle to a document printer and printing readable information on each successive document form based on data inputted at the input unit;
  reading the bar code on each document form with an optical reader when the form is in the printer; and
  dispensing each form, after printing, from the document printer.

Additional objects of the invention are achieved by a method for preparing and dispensing documents relating to financial transactions, the method comprising:
  inputting data and operating commands via a manually operable input unit;
  feeding a succession of document forms from a document storage receptacle to a document printer;
  printing on each successive document form, in the printer with magnetic ink, readable information based on data inputted at the input unit; and
  dispensing each form, after printing, from the document printer.

Other objects of the invention are achieved by a method for preparing and dispensing documents relating to financial transactions, the method comprising:
  inputting data and operating commands via a manually operable input unit;
  reading data stored in machine readable form on a data storage medium in a data reader forming part of the manually operable input unit;
  feeding a succession of document forms from a document storage receptacle to a document printer and printing readable information on each successive document form based on data inputted at the input unit and data read in the data reader; and
  dispensing each form, after printing, from the document printer.

Still other objects of the invention are achieved by a method for preparing and dispensing documents relating to financial transactions, the method comprising:
  inputting data and operating commands via a manually operable input unit;
  feeding a succession of document forms from a document storage receptacle to a document printer and printing readable information on each successive document form, the readable information assigning a monetary value to the document form based on data inputted at the input unit;
  dispensing each form, after printing, from the document printer;
  storing data representing the monetary value of each document and data representing the cumulative monetary value of a succession of documents in a memory;
  establishing communication between a remote location and a communication interface coupled to the memory, and transmitting the data stored in the memory to the remote location.

Still further objects of the invention are achieved by a method for preparing and dispensing documents relating to financial transactions, the method comprising:

inputting data and operating commands via a manually operable input unit;

feeding a succession of document forms from a document storage receptacle to a document printer and printing readable information on each ad successive document form based on data inputted at the input unit;

dispensing each form, after printing, from the document printer establishing communication between a remote location and a communication interface;

periodically transmitting authorization instructions from the remote location to the communication interface; and blocking dispensing of printed documents when reception of an authorization instruction from the remote location has not occurred for a predetermined period of time.

DETAILED DESCRIPTION OF THE INVENTION

Figure 1:
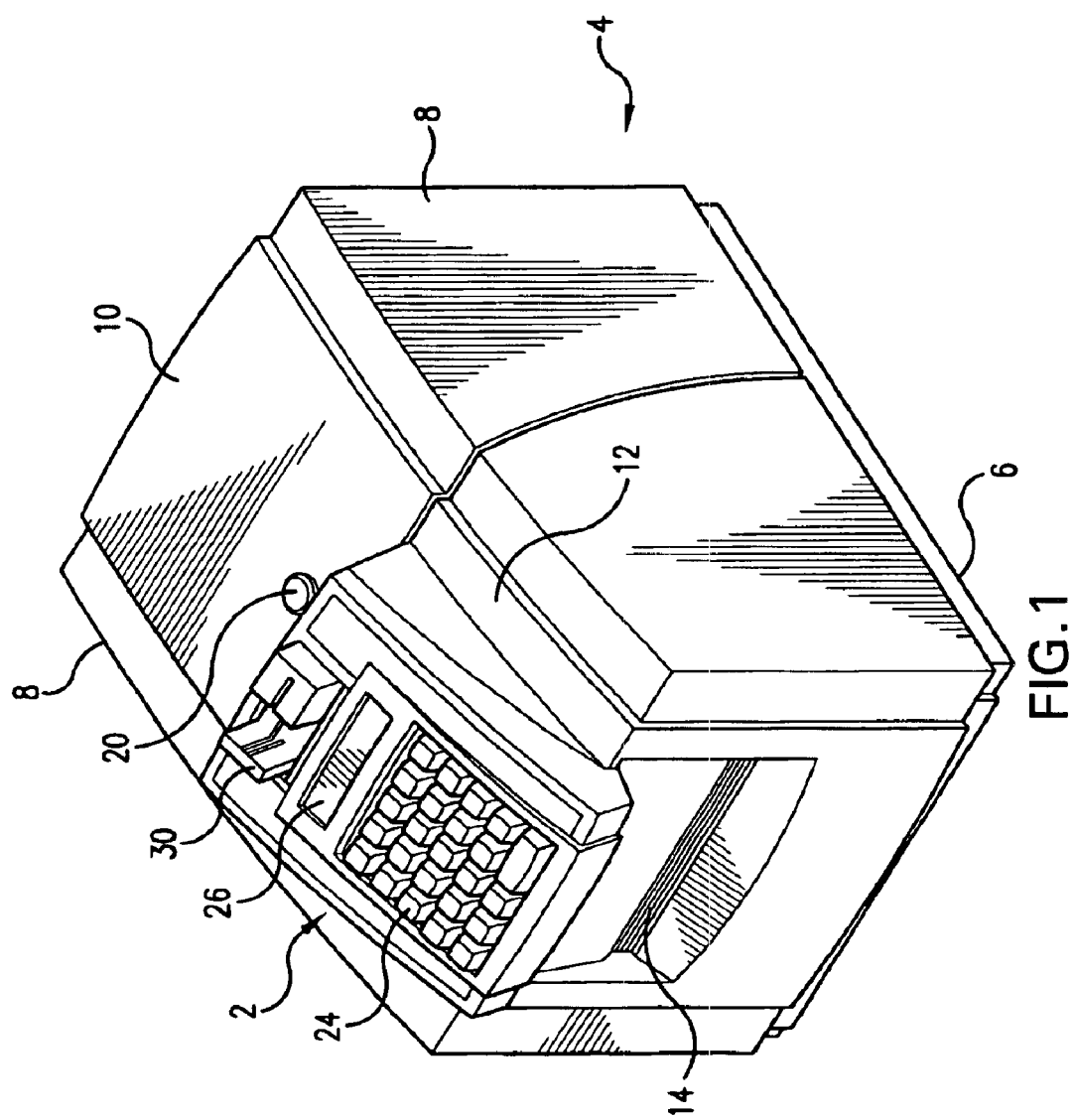
FIGS. 1 and 2 are perspective views showing a preferred embodiment of a machine according to the present invention in two optional configurations.
Figure 2:
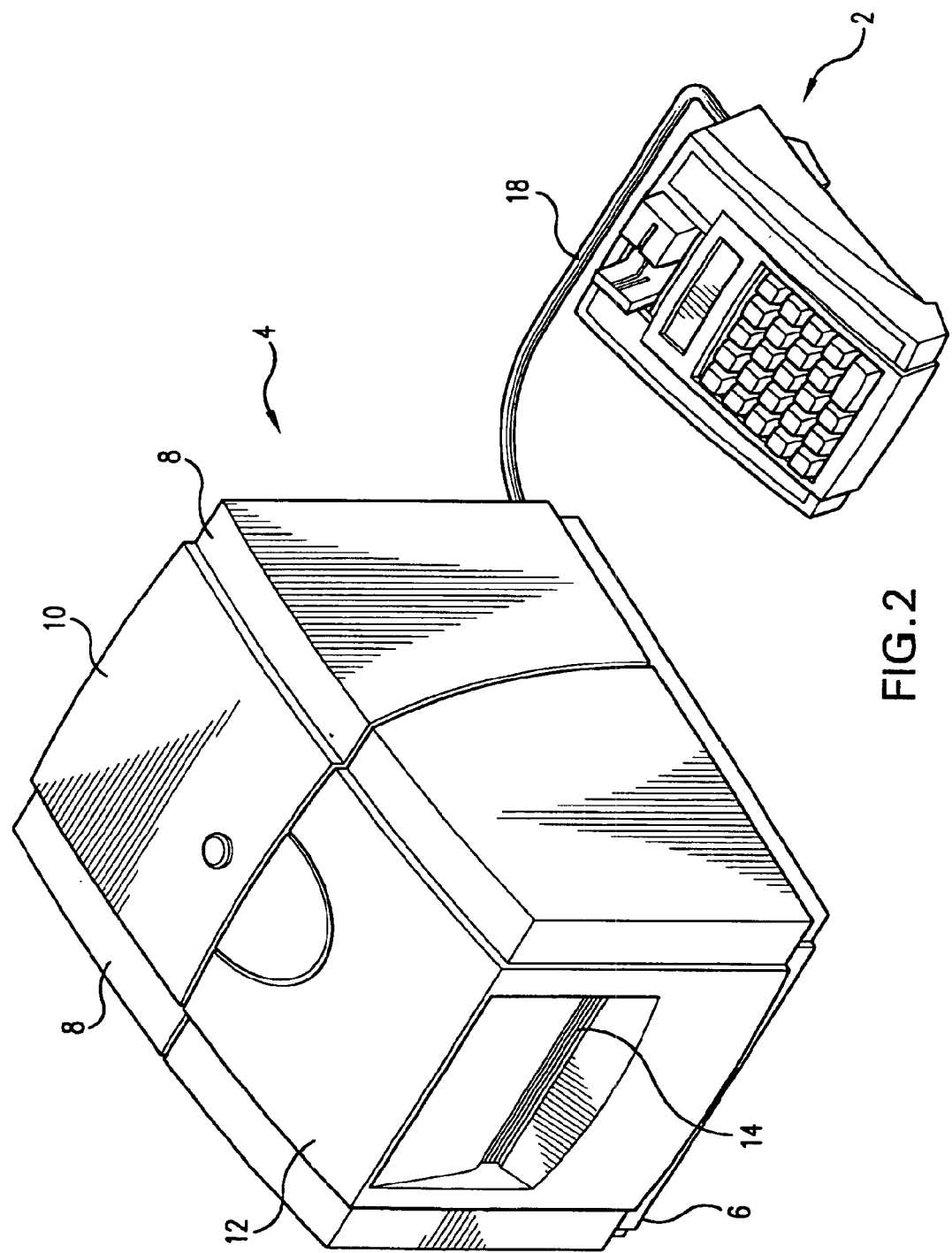

FIGS. 1 and 2 are perspective views showing two configurations of a preferred embodiment of a machine according to the present invention. The machine is composed essentially of three modules: a manually operable input unit, or data entry module, 2; a printer unit, or module; and a terminal control unit, or module. The printer and terminal control modules are both housed in a case 4.

Case 4 is preferably made of metal and is composed of a bottom plate, or base 6, two side panels 8 that are fixed to base 6, a rear panel (not visible in FIGS. 1 and 2, visible as element 34 in FIG. 3) a rear door 10 hinged to the upper edge of the rear panel and a front door 12 having a lower edge that is hinged to the front edge of base 6. Door 12 is provided with a dispensing slot 14 for delivery of prepared documents.

Input unit 2 may be mounted on the upper surface of lid 12, as shown in FIG. 1, or may be placed on a table or counter, alongside case 4, as shown in FIG. 2. The base of input unit 2 is formed to allow unit 2 to rest on a counter or table top, as shown in FIG. 2, and is also configured, in cooperation with the upper surface of door 12, to be mounted securely, but removably, as with screws or bolts, on that upper surface.

For either mounting arrangement, input unit 2 is connected to the control unit by a suitable cable 18 connected at one end to a connector mounted on the rear surface of unit 2 and at the other end to a connector on the back of case 4.

Door 10 can be opened to gain access to a document storage receptacle forming part of the printer unit and door 12 can be opened to gain access to a printer forming part of the printer unit, including access to the print head, as well as to permit clearing of any paper jams that may occur between the printer and slot 14.

Preferably, case 4 is provided with a key operated lock 20 which locks at least door 10 in its closed position. The lock may also, optionally, be configured to lock door 12 in the closed position.

Input unit 2 consists essentially of an array of manually operable keys 24, a LCD display 26, preferably with LED backlighting, and, in preferred embodiments of the invention, a data reader 30 capable of reading data stored in smart cards or on magnetic stripes of debit or credit cards.

Preferably, display 26 contains a high contrast, high viewing angle LCD display with a format of two lines of 20 alphanumeric characters each, including the capability of displaying three special currency characters.

Keys 24 may be constituted, for example, of a 5×5 matrix of full travel alphanumeric keys of the type provided on a push button telephone handset, in addition to a double width double zero key and operating command keys. Alternatively, or additionally, keys 24 may be constituted by those keys typically found on a computer keyboard. The operating command keys may include, for example, keys that perform the following functions.

Clear—clears the previous input that appears on the display; Escape—stops the present procedure and returns to the previous step; Credit Card—indicates that the transaction is being conducted with a credit card; Report—prints a report; Debit Card—indicates that the transaction is being conducted with a debit card; Void—voids a money order or other transaction; Bill Pymt—indicates that a bill payment is being made; No Fee—indicates that no fee is being charged for the current transaction; Next—scrolls to the next option within the current activity; Print—prints the current document; Alpha—switches the numeric keys to alphabetic keys; Enter—enters the operator input, if any, and scrolls to the next action; 00—inputs a double zero.

Unit 2 may be provided with an optional on/off keyswitch whose position will be sensed by the control unit to cause operation to enter an executive mode, which will be described in greater detail below.

Figure 3:
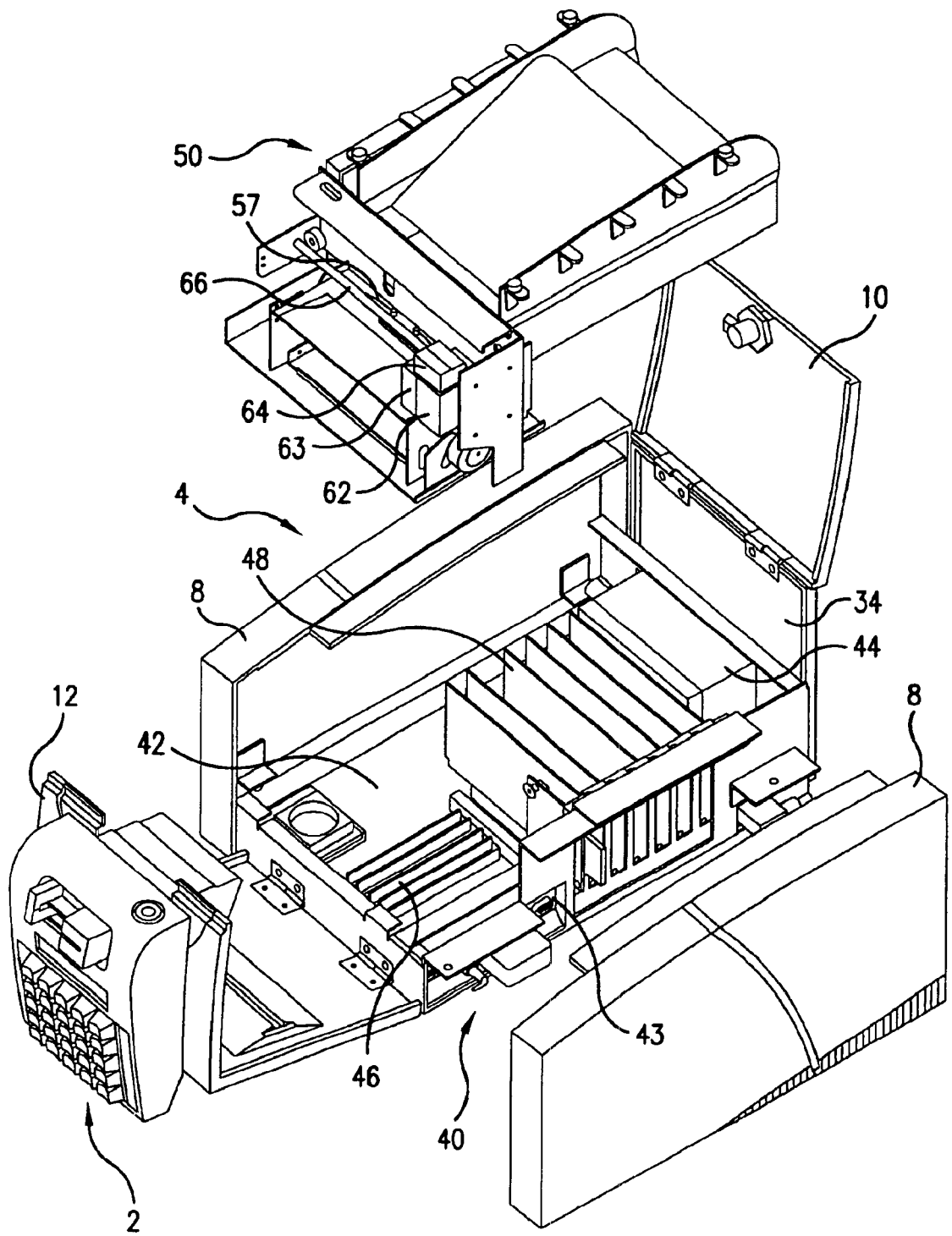
FIG. 3 is a perspective view showing the interior of the machine of FIGS. 1 and 2 with components removed to permit viewing of other components.

Unit 2 also contains its own controller printed circuit board provided with a CPU and a memory connected to operate the devices of unit 2 under control of a main CPU in terminal control unit 40 (FIG. 3).

FIG. 3 is an exploded perspective view showing the machine of FIGS. 1 and 2 in a partially disassembled state. Specifically, one side panel 8 has been moved away from its assembled position and doors 10 and 12 are opened. Therefore, in this view, rear wall 34 of case 4 is visible.

Installed in the lower part of case 4 is the control unit 40 which is constructed in the manner currently used for personal computers to include a motherboard 42, a central processing unit containing a microprocessor, a power supply 44, volatile and non-volatile memories 46, preferably including a non-volatile flash memory whose contents can be altered from a remote supervisory location via a telephone link, and a plurality of cards 48 selected by to perform various functions, including communications with the other modules of the machine and with a remotely located central location.

According to one preferred embodiment of the invention, the central processing unit should be at least at the 486 level with a 33 MHz clock, running a version of DOS 6.22. Motherboard 42 carries at least a main memory having a minimum of 4 Mb of Fast Page RAM, with a minimum expansion capability for an additional 32 Mb of memory. The system clock is a real-time clock which is processor controlled and provided with a battery back-up. Motherboard 42 further carries a non-volatile secondary memory having a minimum capacity of 8 Mb. A terminal program, report information and translation logs reside in this memory. The system is capable of being expanded to have at least 80 Mb of memory of this type.

Motherboard 42 further carries, on one or more of cards 48, or directly on board 42, a group of interfaces including two serial ports on one card, at least one parallel port and at least one standard PS/2 style connector and interface. One of the two serial ports is used to communicate with unit 2, while the other is used to control printer unit 50, to be described below.

The parallel port is provided to communicate with an optional external lister printer. The P/2 connector and interface are provided particularly for optional connection 2 a standard personal computer keyboard.

Cable 18 is hardwired to control unit 40 at a connection point that is preferably located at the bottom of case 4 in a recessed area. This location helps to reduce the risk of tampering or accidentally disconnecting various cables. A first connector panel (not visible) at the rear of case 4 includes at least the following components: an AC input connector; an RJ 11 phone line jack; and an RJ 11 phone jack (pass through). A further connector panel 43 carries the PC keyboard plug (PS/2 type) and possibly other connectors.

Control unit 40 also includes an expansion area that can accommodate a number of additional cards, a manual power cut off switch and an internal modem. The switch is provided to allow manual shut off of the entire machine and is normally left on unless control unit 40 is being serviced. The internal modem may be of the auto answer/auto-dial type with a data transfer speed of at least 14,400 bits per second over voice grade phone lines.

Figure 4:
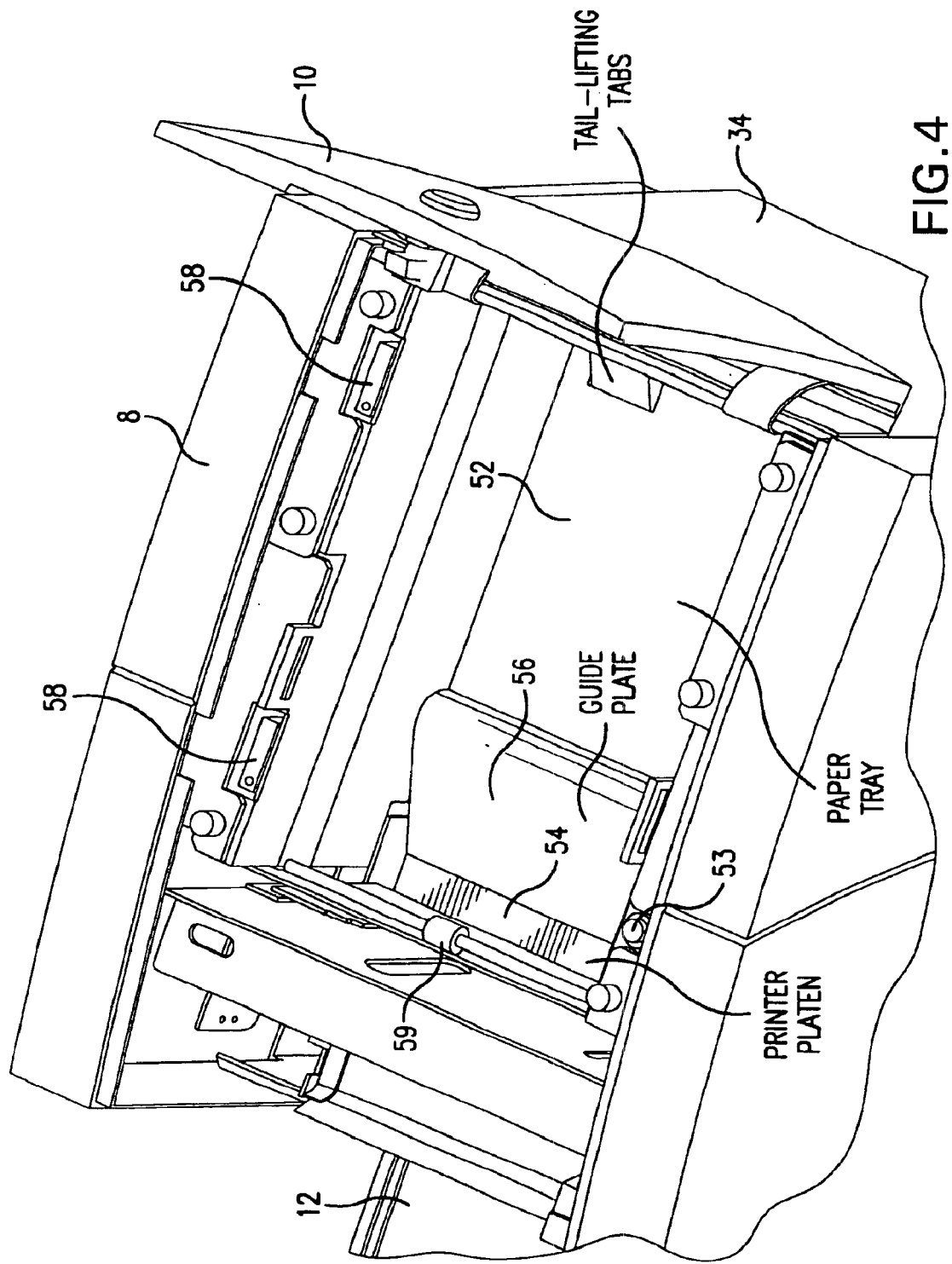
FIG. 4 is a top perspective view showing printer unit components of a printer unit of the machine of FIGS. 1–3.

FIG. 4 is a perspective view of the machine according to the preferred embodiment of the invention. In this view, the machine is viewed from the top with doors 10 and 12 open to allow the components of printer unit 50 to be viewed. The basic components are a document form storage receptacle, or paper tray, 52, an ink jet printer which includes an essentially flat printer platen 54, and a document form guide system including a guide plate 56 for guiding each one of a plurality of document forms in succession from receptacle 52 to platen 54.

Receptacle 52 is provided with tail-lifting tabs which raise the back end of the stack of document forms to facilitate manual removal of those forms if necessary.

FIG. 4 further illustrates that the machine according to the invention is equipped with door open sensors 58. These sensors 58 can be microswitches that are coupled to control unit 40 to halt operation of the machine if door 10 should be opened.

In printer unit 50, paper is transported along a single paper path by a unidirectional friction drive preferably composed of a single set of rollers, including an idle roller 57 (FIG. 3) and a drive roller 59 (FIG. 4), both of which are located above the document forms as they are fed to the print head. In the preferred form of drive, paper does not travel over the wheels or rollers and there is a minimal risk of paper jams.

Provision is made for a transport inhibit function which opposes false advance of document forms through the printer. The transport will feed the document forms at a rate of at least 4 inches per second and is constructed to handle documents having a width of up to 6 inches.

Preferably, the document forms are fed in cooperation with printer operation to perform printing with a line pitch of 6 lines per inch over a print zone having a width of the order of 4.5 inches.

A paper advance button 53 is provided inside case 4. Both a form feed and a line feed mode can be available.

Printer platen 54 forms part of the printer of printer unit 50. The printer includes, as is visible in FIG. 3, a print head 62 carried by a carriage 64. Carriage 64 is movable along a support rod 66 in a direction perpendicular to the direction of movement of document forms through the printer.

Carriage 64 is driven by a conventional mechanism and print head 62 is constructed according to principles well-known in the art. Indeed, the printer can be constituted by a commercially available ink jet printer which is constructed, or can be adapted to be mounted in printer unit 50.

Figure 6:
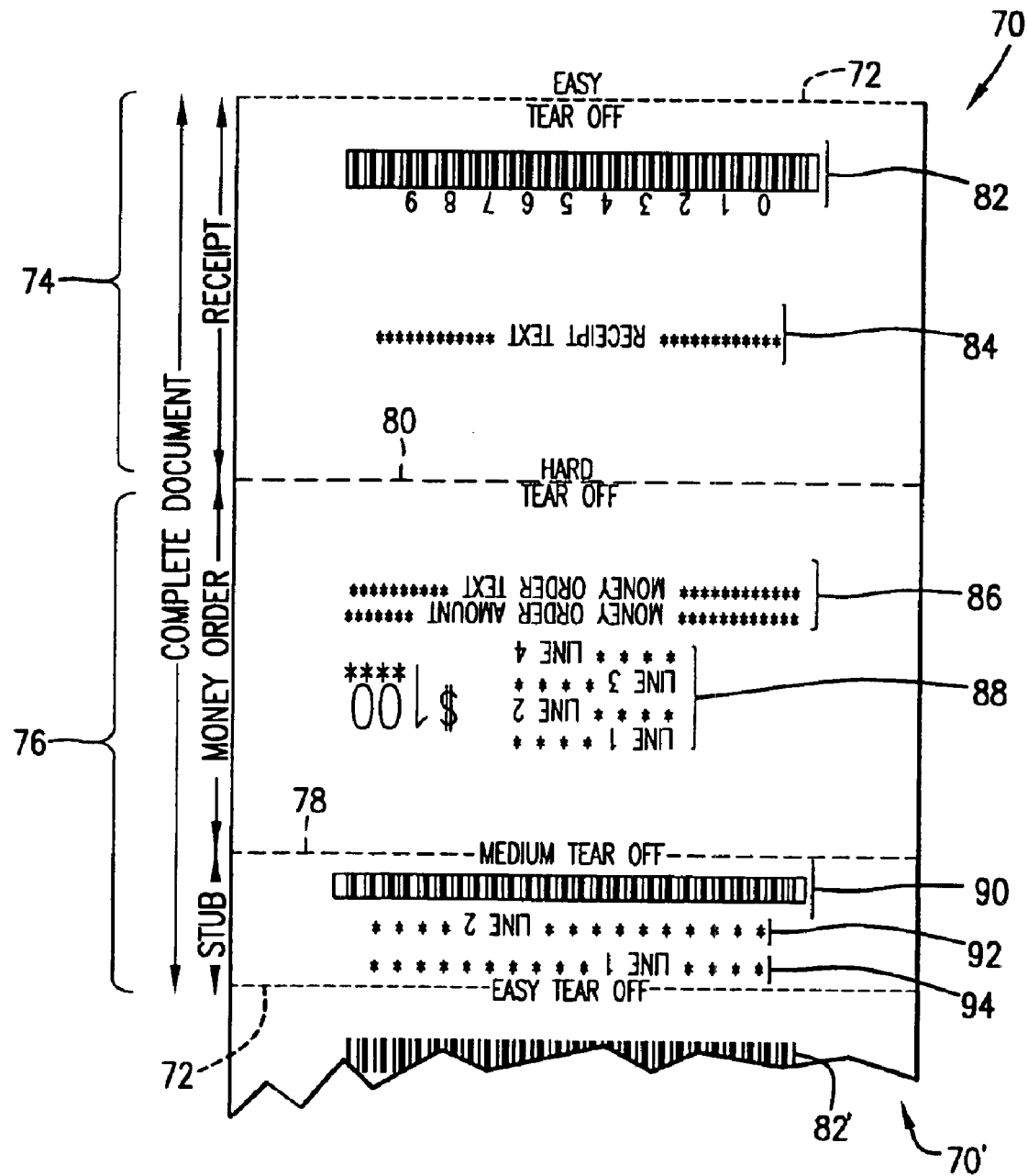
FIG. 6 is a pictorial view of a document prepared by a machine according to the invention.

Prior to being loaded into tray 52, each document form is preprinted with a bar code 82, as shown in FIG. 6, that contains a sequence number uniquely identifying that money order form. In a stack introduced into receptacle 52, successive forms will have successive sequence numbers. Each form 70 will further be provided with a conventional "top of form" mark which is formed of optical black ink having a specific reflectivity and position. This mark is located on the back of each document 70, 70', etc. and is therefor not visible in FIG. 6.

According to a particular novel feature of the invention, print head 62 carries a bar code reader 63, which may also be of a conventional type, for reading a bar code which was preprinted on each document form or which is printed in printer unit 50. Thus, bar code reader 63 can serve as a verifier of a bar code which has been printed or is being printed on the document form. Preferably, printing is effected while carriage 64 is displaced in one direction along rod 66, and a reading function is performed with bar code reader 63 during the return movement of carriage 64. Thus, one advantage of an ink jet printer is that it includes a carriage that must of necessity traverse a printing region transverse to the document form feed direction and that can thus displace a bar code reader along a path suitable for reading a bar code.

In a preferred mode of operation according to the invention, each sweep of carriage 64 along rod 66 occurs in approximately 350 milliseconds to produce one line of standard print, or one-quarter of a custom print line.

The printer can be further associated with a tear bar that will separate two contiguous document forms along a clean sharp edge.

Printer unit 50 further includes a variety of sensors which can be constructed and arranged in a manner known in the art. These include a top-of-form sensor, an out-of-paper sensor, the rear door sensors 58 that were already described above, and a similar front door sensor (not shown, except for sensors 58).

The top-of-form sensor is an optical sensor that will be focused on a reserved area of each document form which is provided with a top-of-form mark. This sensor will be connected to control unit 40 to assist in achieving form alignment and determination of the presence of an unprinted document form.

The out-of-paper sensor is located in receptacle 52 and provides an indication of an "out-of-paper" status when there are no more document forms in receptacle 52.

Sensors 58 provide an indication when door 10 is opened and the print head access sensor provides a corresponding indication when door 12 is open.

Print head 62 may be constituted by virtually any commercially available ink jet print head. By way of example, it is presently contemplated to employ a HP® thermal ink jet head, such as a head sold under the model designation 626A. The optical bar code reader may also be of a commercially available type and is mounted on carriage 64 close to head 62.

Printer unit 50 further includes a printer controller of a conventional type having stand-alone intelligence and including a CPU that controls real-time printer functions, including sensing the positions of doors 10 and 12. The printer controller may communicate with the main CPU of control unit 40 using a RS-232 C interface, hardware handshaking and a suitable protocol. The program for directing operation of the printer controller will be loaded on an associated flash memory card.

The printer controller may support two or more font sets. Preferably, a first font set includes a complete ASCII character set with at least three international currency symbols. The printer controller must be capable of printing this font set either right side up or upside down. A second desired font set is a custom font having, at the least, numerals, special currency symbols, a custom trademark symbol and a special bar code verify symbol. The characters of the second font set preferably have a height which is four times that of the first font. The characters of the first font set can be printed during one pass of print head 62, while printing of characters of the second set requires 4 passes. Characters of the second font set need be printed only upside down.

Printer unit 50 further includes a rocker switch via which an agent who is responsible for the machine can control power to the machine. This switch controls a sleep mode only and its operation is superseded by an internal power cut-off switch in control unit 40.

Printer unit 50 will normally print with ordinary ink, preferably thermal ink. However, it would also be possible to utilize magnetic ink, which is available for use in ink jet print heads. This would open the possibility of producing financial documents that require characters printed in magnetic ink, starting from totally blank document forms. It would then be possible, by providing suitable software, that can be downloaded to a flash memory in control unit 40 via a telephone link, to generate and dispense different types of documents from the same blank document supply. This will also allow a complete image of the resulting document to be stored electronically. In addition. An ink jet printer will produce a consistent printed product and this will facilitate distinguishing authentic documents from counterfeit documents.

Printer unit 50 further has a separate power supply connection via which power is normally supplied from a power outlet. However, it is conceivable that printer unit 50 could be connected to some other control device, in which case use would be made of an external power adapter.

Input unit 2 includes a separate case, or housing, the bottom of which is equipped for mounting unit 2 either on a counter top or on the top surface of door 12.

As noted above, Input unit 2 may include an optional on/off key-operated switch. The on/off state of the switch is detected by an appropriate sensor which is connected to control unit 40 to determine whether operation is to be performed in the executive mode. Reader 30, mounted in the case of unit 2 may be any suitable, commercially available, card reader capable of reading credit, debit, or "smart" cards. One type of reader that is presently contemplated is manufactured by American Magnetics under model designation 171/121.

Figure 5:
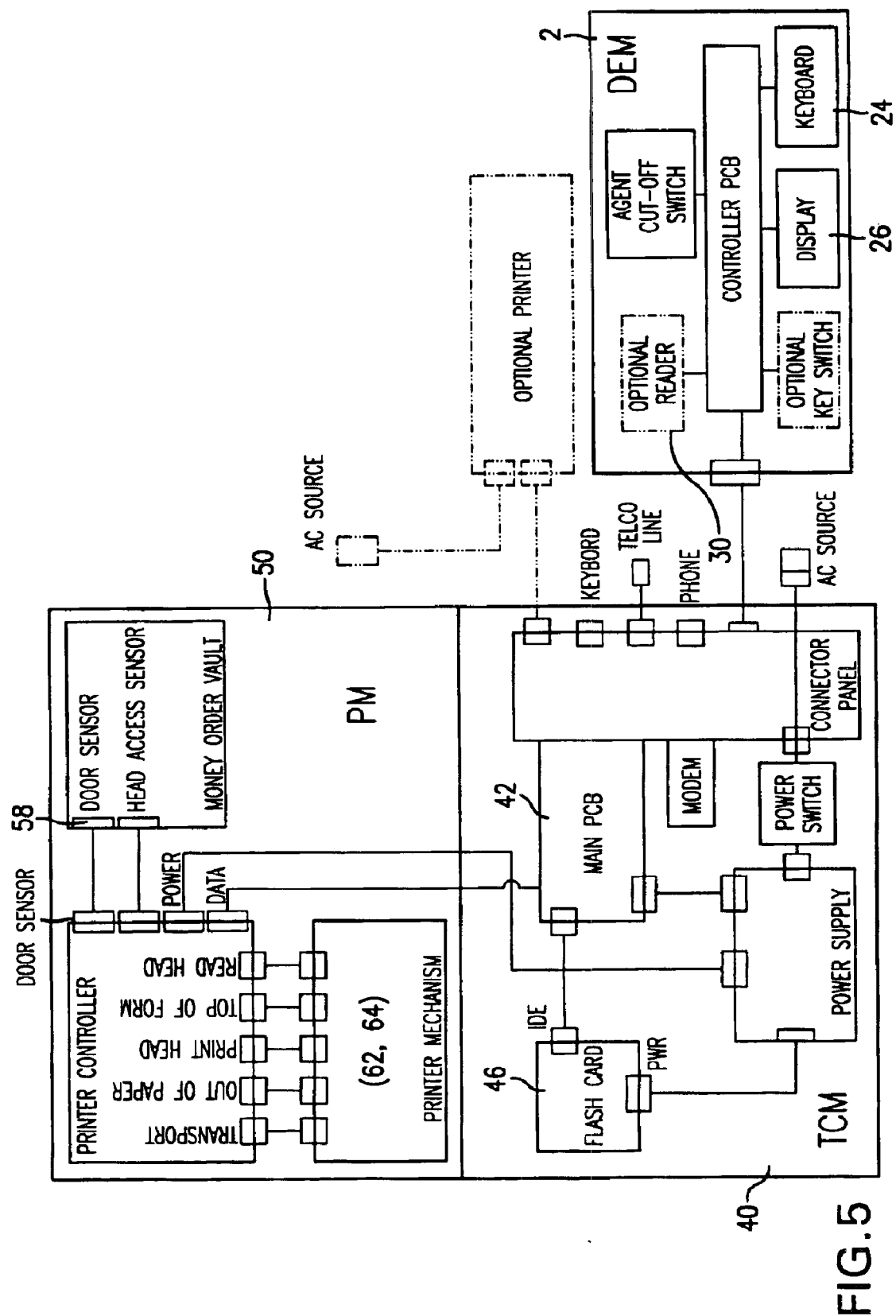
FIG. 5 is a block diagram of the components of the machine of FIGS. 1–4.

FIG. 5 is a pictorial diagram illustrating various essential components of units 2, 40 and 50. All of the elements shown in FIG. 5 have already been described above or are identified by suitable legends.

FIG. 6 is a pictorial view of one type of document which can be generated according to the present invention. The document in question is a money order 70 that will be generated starting from a money order form. Initially, a strip of such forms will be introduced into receptacle 52 with successive forms being attached together at tear-off lines 72. The paper will be pre-cut to permit each completed document to be separated, after passing through printer unit 50, from the remaining document forms.

It is presently preferred that each document form consist of two parts: a receipt 74 and a portion 76 that will constitute the actual money order. Alternatively, as illustrated in FIG. 6, part 76 may consist of the money order and a stub connected to the money order along a line 78 which is partially pre-cut to permit the money order to be separated from the stub. In addition, the money order is separated from receipt 74 along a further line 80 that is also pre-cut. When each document form consists of only two parts 74, 76, the various lines will be precut to allow the paper to be torn more easily along line 72 than along line 80. If each form is also pre-cut along line 78, this will be done in such a manner as to allow the paper to be torn along line 78 more easily than along line 80 but less easily than along line 72.

Bar code 82 may be, for example, based on the Code 39 bar code system and consists of at least four sections. The bar code will contain a money order sequence number and one or more check digits for permitting error detection and possibly correction, during bar code reading. Bar code 82 will be associated with a human readable money order sequence number.

When a document form is fed through printer unit 50, the alignment mark is first detected and bar code 82 is read with the aid of bar code reader 63 mounted on carriage 64. The information read by bar code reader 63 is transmitted to control unit 40, where the money order sequence number will be compared with that of the money order that was previously prepared and dispensed to assure that there is no break in the money order sequence numbering.

As document form 70 is conveyed through printer unit 50, in the transport direction illustrated in FIG. 6, a receipt text 84, which is one line high, is printed on receipt portion 74. Then, on the money order document 76, there are printed, in succession, a money text and a money order amount 86, each of which is one line high, and the money amount 88, including a suitable currency symbol. Money amount 88 is preferably printed in the special custom font having a height of several lines, for example four lines. There may then also be printed, either on the money order document or on the stub, if this is provided, a further bar code 90 that contains the associated document sequence number and the money order amount.

Bar code 90 will be read by bar code reader 63 as the resulting document exits from the machine. This reading operation will permit verification that the machine software has correctly determined the money order sequence number of the particular form 70 and that printer unit 50 has performed a printing operation; otherwise, bar code 90 would not appear or would be insufficiently dark to be read by bar code reader 63. The money order sequence number contained in bar code 90 may then be compared with the bar code number 82 of the next form 70' to verify that there has been no break in the money order sequence numbers. After bar code 90, it is also possible to print a message text 92 and a stub text 94, each of which has a height of one line.

Preferably, bar code 82 is located relative to adjacent tear-off line 72 so that when a completed document has been dispensed by being torn off along an associated line 72, the bar code 82 of the following document form will be in line with the reading field of bar code reader 63.

The operation of a machine according to the invention will be controlled, or at least supervised, from a remote location which receives reports from the machine, via a telephone connection, on a periodic basis and issues authorization instructions to allow the machine to continue dispensing documents. Typically, the remote location will be established to monitor and supervise a number of these machines which are installed at different point-of-sale locations. A remote location which can cooperate with a machine according to the present invention can be constituted by a personal computer which is suitably programmed to establish communication with one or more machines, receive and display data from each of those machines and transmit authorization and control instructions back to each machine. The computer at the remote location will be staffed by a human operator who will review the data received from each machine. If that data does not reveal any adverse conditions or inappropriate operation of the machine, the operator will input an authorization command via the computer keyboard and then transmit that command to the individual machine. In this system, other commands can be transmitted from the remote location to a machine to modify the operation of the machine in a desired manner.

The operation of a machine according to the invention will now be described with reference to the operation, or programming, flowchart of FIG. 7 and with respect to a machine which is configured to issue money orders. However, the machine according to the invention can easily be programmed to issue other types of financial documents, as will be described at a subsequent point herein.

Unless otherwise specified, all of the operations described below are performed under control of software provided in control unit 40.

Figure 7:
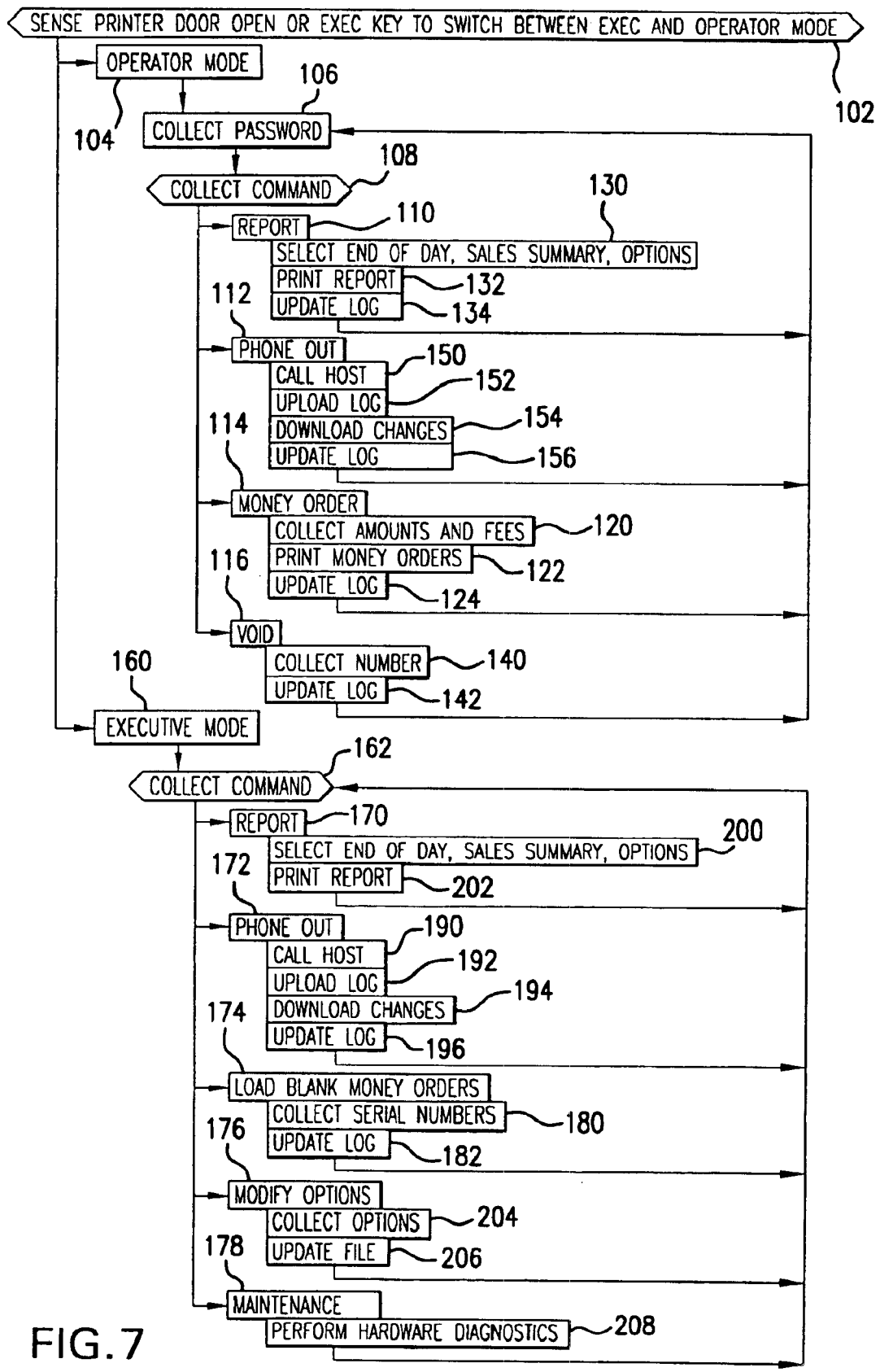
FIG. 7 is a flow chart illustrating the operation of a machine according to the invention.

When the machine is first placed in operation, a number of operations are performed and conditions are detected in startup step 102 of FIG. 7. These include monitoring the states of the door sensor switches and of a key switch to determine whether operation is to be performed in an operator mode or in a executive mode. All hardware, including the printer controller, is initialized and a stored options file and log file are read from flash memory in control unit 40. Essentially, the operator mode is employed to generate and dispense money orders, while the executive mode is employed to perform supervisory and maintenance functions on the machine. Operation in either mode is performed by an individual who is stationed at the machine and who communicates with the machine via input unit 2.

If the operator mode is selected, at step 104, the operator is prompted to input a password, which is checked at step 106. If the correct password has been input the system determines whether any actions indicated in the options file, such as generating a report, are to be performed, and performs these actions. The operator can then input a function command, which is detected at step 108. In the example illustrated, these commands can include generating a report in procedure 110, establishing a telephone communication link in procedure 112, generating a money order in procedure 114, or voiding a transaction in procedure 116.

Generation of a money order in procedure 114 will include the following operations. Firstly, in step 120, the operator will collect payment for the money order which includes the face value of the money order and any service charges and will input the amount of the money order and of the transaction fee. If a credit, debit or smart card is being employed to pay for the money order, the operator will input the amount to be charged to the card account, the card will be inserted into the card reader and a telephone connection can be established in order to obtain authorization to charge the amount involved in the transaction to the account represented by the card. At this point, a number of conditions can be checked, including whether the requested money order amount exceeds a preset limit, whether the machine is currently authorized to issue further money orders, whether the previous transaction has been correctly closed and whether there is a document form available in the machine. If the system is operating properly, a document form will be available in the printer unit in a position such that bar code 82 can be read by bar code reader 63. At this time, in step 122, bar code 82 is read and the document sequence number represented by that bar code is compared with the sequence number of the previous money order that was issued in order to confirm that the correct document is in position to be printed. At this time, the system can also check further conditions, such as whether the bar code that has been read is associated with the first document form of a pack of forms, whether a door has been opened and closed, or power has been turned on or off since the issuance of the previous document and whether there is any paper jam in the printer. If all conditions have been satisfied, printing of the mponey order can proceed. Upon completion of printing the money order the transaction log. Any problems encountered within the machine during the transaction are also logged.

In procedure 112, the operator will call the remote location in step 150. After a telephone connection has been established, the transaction log maintained in control unit 40 will be uploaded to the remote location in step 152 and any changes to be made to the machine will then be downloaded from the remote location in step 154. In addition, the log maintained by control unit 40 is then updated to indicate that the log was uploaded.

When report procedure 10 is selected, the operator inputs the type of report, such as agent shift report, daily summary report, sales summary, options, etc, in step 130. In response, in step 132, the machine prints the report and in step 134 the transaction log is updated to record occurrence of the report printing operation.

The agent shift report can include the following items of information: Agent ID; agent number; machine number; date and time of report; total due; total value of commission; total value of documents dispensed; total value of fees; total amount collected; total number of documents dispensed; value of non fee documents dispensed; number of non fee documents dispensed; value of fee documents dispensed; number of fee documents dispensed; value of voids; number of voids; documents left; status serial, indicating on report whether each document is a void, no-fee, or void, no-fee document, and value of each document dispensed.

The daily summary report can include the same items of information, except that, in place of status serial and value of each document dispensed, the report will include the time value status serial, indicating the specific time of transaction for each status serial document, and seller of each document dispensed.

In procedure 116 to void a transaction, the operator inputs the serial number and the cash value of the money order to be voided in step 140. If the amount inputted is correct for that money order number, then the log is updated in step 142 to indicate that the money order in question is void.

The executive mode, selected in step 160, allows the performance of various functions which cannot be performed by the ordinary operator, these functions including changing the passwords and other options, loading a new supply of money order forms, etc. The executive mode can be selected by inputting an executive key. One who is authorized to enter the executive mode will also have a key to open at least door 12 for loading new money order forms and a key for turning the executive keyswitch on. If the system determines that door 12 is open, but that the executive keyswitch is not on, the system is set to operate in the low level executive mode. If the executive keyswitch is on, the system is set to operate in the high level executive mode. Otherwise, the system will switch into operator mode.

When switched into either executive mode, the system performs a routine to determine if any selected events are to occur and, if so, executes those events.

Certain executive commands, or procedures, are only permitted in the high level executive mode. These are determined by options that are stored in the flash memory and can be changed by commands inputted in the high level executive mode or commands downloaded from the remote location.

If the machine is in the executive mode and the load blank money orders procedure 174 is selected, the machine interrogates the operator to determine what is to be done with any blank forms that have not been used. Then, in step 180, the operator inputs the serial numbers and the size of the new stack of forms to be loaded and, in step 182, updates the transaction log with this information. At this time, in addition, bar code reader 63 associated with the printer can read the bar code on the first form to verify that the sequence number information inputted by the operator is correct.

In the phone out procedure 172, a telephone connection will be established with the remote location in step 190. After that connection has been established, the contents of the transaction log will be uploaded to the remote location in step 192 and any changes to be made to the machine are downloaded in step 194. These changes can include enabling or disabling agent pass codes resetting current time and date, resetting a fee table, etc. Then, in step 196, the log is updated.

In report procedure 170, the following reports can be printed, as well as others. A current daily report, a previous daily report, a document list, a machine set up report, a report deleting the oldest day, the oldest day being the earliest day for which data is currently stored, and a report of the current display version.

This is performed in step 200, in which it is also possible to set, by inputting via input unit 2, various report options, including selection of the desired device to which reports are to be printed, to which messages are to be printed and to which an audit trail is to printed. After all selections have been made, the selected report is printed in step 202.

In procedure 176, a variety of options can be set or reset, based on information input by the agent via input unit 2 in step 204. Options that can be modified in step 204 include: selection of which executive functions require an executive key; setting of agent timeout; enabling or disabling of a lockout period based on the inputting of a begin time and an end time; calculate change options, such as change the calculation required and change the key required to reset the display; communication options, including: comm. password; baud rate selection; modem dialing mode (tone or pulse); primary telephone number and secondary telephone number; document options, such as whether or not to print a stub, reset options, including resetting the document memory and resetting all of the memory; special function options, including machine number, which is the number assigned to each machine at a particular location, agent number and terminal serial number, which is assigned at the time of manufacture; remote location, or host, communication options, such as redial time, number of redial tries, response time and command time; and diagnostic options including whether to test the list printer, and/or the main printer, and/or bar code reader 63; and/or communication components. After any desired option changes have been made, the file or files in which these options are stored are updated in step 206.

Maintenance procedure 178 includes, in step 208, performing any hardware diagnostic operations that have been preselected as diagnostics options.

There are other options that can also be changed, but preferably only from the remote location via an established telephone link. These include setting of the commissions, or fees, that can be charged at the sale location, as well as the following options:

Report options: Op. Daily to close; Auto-Dly Close Out; Auto-Daily Time, Cumulative summary, Communication options: Enable Communications, Document Options: Maximum Doc. Amount; Maximum Pack Size; String to print on stub, Void Authority options: Void Authority (Any Untransmitted, Current day); MaxAutomatic Void; Max Manual Void, Security Values: Modify System Vars; Security Lock; MaxDays without Poll; MaxItems Per Day; MaxAmount Per Day, Currency: Which of the three currency symbols to use.

Set Up Report Options: Baud Rate; Flow Control; Control Line; Timeout; End of Line; Select Rpt. Char/Inch; Lister Rpt. Contents; Lister Rpt. Lines; Cir Acc After Sumry; Print Auto-Dly Rpt; If Lister Time-out; Auto-Dly Rpt Copies; Close out Sunday . . . Saturday; Void on Report When a communication link is established, the operator at the remote location can also transmit instructions to change which executive functions require an executive key. However, this operation is not performed exclusively under control of the remote location, but can also be performed by an individual authorized to operate the machine in the executive mode.

In addition to the above, the following options can be provided if desired.

Communication options: Mode; Password for Host; Modem Standard; Enable Auto-Dial; Auto-Dial Begin Time; Auto-Dial End Time; Dial Sunday . . . Saturday, Document options: MaxVendor Payment; Packet Termination; Document Length; Stub format; SN Check; Print Courtesy Amount; Print Void Over; SN Sequencing; Sequence Check Digit, Void Authority options: Jam Auto Void, Special Function options: Document Print Fmt; Comm Report Fmt; Store Number; Chain Number; Dial out. Digits, Security Value options: Recheck items; Recheck Amount, Host Comm Setup options: User ID.

The normal process for printing a money order is as follows:

read the bar code, verify it is the next expected in sequence, print the money order, receipt, and stub, print a machine readable mark/bar code, verify the mark is readable (verifies ink is on the paper), move the next money order into position, and verify that the sequence number on the next money order is the next expected number (verifies paper has moved).

If the bar code cannot be read, the machine will prompt the agent, print a void money order, and ask the agent for the serial number on the voided document. The machine will then proceed in "softfail" mode, printing without verifying as long as the printer door remains closed and the power remains on.

If the serial number (either read or entered) is not the next expected number but has advanced by less than 10 numbers, the machine will automatically log the missing documents as void.

If the ink test fails, the machine will ask the agent if the document is readable and log it as void if it is not readable.

When daily closing is effectuated, a Daily Summary report is scheduled to be printed as soon as a printer is available. Also, a closing communication is scheduled to be sent to the system as soon as the phone is available. A daily closing may only be performed once per calendar day. Any sales after closing go onto the next day's sales. Accumulators for daily limits are also reset at this time.

Daily closing may also be done manually by running the Daily Summary Report (if Op. Daily to Close is true). If it has not been performed manually by the auto close time (Auto Dial Begin Time) it will be performed automatically. If, when a machine is switched on, it detects the auto close time has passed, a close will be performed as if it were that previous day.

The machine will have the ability to store information for at least 2,500 documents.

There are two daily security limits: maximum number of items, or transactions, (MaxItems) per day and maximum total cash value of transactions (MaxAmount) per day. The machine will not interrupt a current customer; that is, if an agent is below all security limits before the start of that customer's transaction and that transaction causes the agent to pass a limit, the current customer transaction will be completed and then the machine will sell no more until it has communicated by phone with the central, or remote, system and received authorization to proceed.

Voided documents count toward the daily limit.

The security limit MaxDays Without Poll is enforced at closing.

Printing of a stub can be turned on or off. The stub format is fixed, but it includes a string which is sent from the system and that string can be set by the system any time it is connected by phone.

While there has been provided a detailed description of the operations involved in printing a money order, one significant advantage of the machine according to invention is that it can be easily programmed to dispense other types of documents. For example, by simple software modifications and the provision of a different type of document form, the machine can be configured to handle charge and debit transactions. For example, a credit, debit, or smart card may be inserted into reader 30 and the amount of a transaction can be keyed into unit 2. Then, optionally, keyboard 24 of unit 2 can be employed to dial out to an authorizing location, or such dialing out can be controlled automatically by the program. When authorization to accept the charge has been received via the telephone connection, a credit card transaction receipt can then be printed out by printer unit 50.

Similarly, bill payments can be made, by use of a credit, debit, or smart card, or by transferring cash to an agent, who then uses key pad 24 to input identification of the payee, the amount paid and the phone number of the financial institution to which payment is to be transferred. Here again, printer unit 50 is used to print out a receipt.

In addition, a machine according to the invention can be used to effect wire transfers or to generate phone cards, ID cards, gift certificates, or travelers checks. Other types of financial transactions will become apparent to those skilled in the art.

According to a further feature of the invention, if the machine should be disconnected from its power source and subsequently reconnected, the control system can be configured to report the disconnection of the machine to the remote supervisory location and to prevent further transactions until a new authorization has been received from the remote supervisory location.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A machine for preparing and dispensing documents relating to financial transactions, said machine comprising:

(a) a document dispenser, said dispenser having a housing;

(b) a manually operable input unit for input of data and operating commands, said input unit being external to and coupled through said dispenser housing;

(c) a document printer unit for printing readable information, including a monetary value, on document forms based on data inputted at said input unit, wherein said document printer unit is contained entirely within said dispenser housing and comprises:

a document form storage receptacle for holding the document forms prior to being printed;

a printer for printing the readable information on the documents to produce completed documents;

a feed mechanism for feeding the document forms in succession from said receptacle to said printer and for dispensing said completed documents; and an optical reader for reading barcode information on said document forms, said reader being operative to verify proper functioning of said printer unit by reading a barcode that is printed on said document forms by said printer inside the dispenser prior to dispensing;

(d) an internal control unit, wherein said control unit is contained entirely within said dispenser housing and is directly electrically coupled to said input unit and said printer unit for controlling operation of said printer unit in response to data and commands inputted at said input unit, and wherein the control unit comprises:
- a central processing unit containing a microprocessor operable in response to program instructions;
- input/output means connected for receiving the data and operating commands inputted at said input unit and for supplying data and control signals to said printer unit; and
- memory means for storing the program instructions for said microprocessor and for receiving and storing data received by said input/output means from said input unit and representing at least the monetary value of each document, as well as data received by said input/output means from said optical reader for the same document;

(e) a communication interface for conducting communications with an off-site central location remote from said dispenser and operative to transmit the data stored in said memory means to said central location; and (f) a time keeping device, wherein said dispenser is a stand-alone, self-contained dispenser, said control unit is operative to receive authorization instructions from the central location via said interface, and said control unit is operative under control of said time keeping device for blocking dispensing of printed documents when no transmission of the data stored in said memory means to the central location has occurred for a predetermined period of time or when reception of an authorization instruction from the central location has not occurred for a predetermined period of time.

2. The machine according to claim 1, wherein:
said printer comprises a print head for dispensing ink to form the printed information on the document forms;
said print head is mounted in said printer for movement in a scanning direction while dispensing the ink;
the scanning direction is transverse to the feed direction; and
said optical reader is mounted for movement with said print head.

3. The machine according to claim 2, wherein said printer contains a supply of magnetic ink to be dispensed by said print head.

4. The machine according to claim 1 in combination with a plurality of the document forms held in said receptacle, and wherein each of the document forms is a preprinted form provided with information uniquely identifying that document.

5. The machine according to claim 4, wherein the information uniquely identifying each document is in the form of a bar code.

6. The machine according to claim 1 in combination with a plurality of the document forms held in said receptacle, and wherein each of said document forms is a blank form and said printer contains a supply of magnetic ink to be used in printing on said documents.

7. The machine according to claim 1, wherein said input unit comprises a data reader for reading data stored in machine readable form on a data storage medium.

8. The machine according to claim 1, wherein the data stored in said memory means further includes the cumulative monetary value of a succession of documents.

9. The machine according to claim 8, wherein said control unit is operative to block dispensing of printed documents when said cumulative monetary value exceeds a predetermined value and an authorization instruction to dispense further printed documents has not been received by said control unit.

10. The machine according to claim 1, wherein the input unit includes a keyboard in operable communication with the machine.

11. The machine according to claim 10, wherein said keyboard is a standard personal computer keyboard and is directly electrically connected to said control unit.

12. A method for preparing and dispensing documents relating to financial transactions, said method comprising:
providing a machine comprising:
(a) a stand-alone, self-contained document dispenser, said dispenser having a housing;
(b) a manually operable input unit for input of data and operating commands, said input unit being external to and coupled through said dispenser housing;
(c) a document printer unit for printing readable information, including a monetary value, on document forms based on data inputted at said input unit, wherein said document printer unit is contained entirely within said dispenser housing and comprises:
- a document form storage receptacle for holding the document forms prior to being printed;
- a printer for printing the readable information on the documents to produce completed documents;
- a feed mechanism for feeding the document forms in succession from said receptacle to said printer and for dispensing said completed documents; and
- an optical reader for reading barcode information on said document forms, said reader being operative to verify proper functioning of said printer unit by reading a barcode that is printed on said document forms by said printer inside the dispenser prior to dispensing;

(d) an internal control unit, wherein said control unit is contained entirely within said dispenser housing and is directly electrically coupled to said input unit and said printer unit for controlling operation of said printer unit in response to data and commands inputted at said input unit, and wherein the control unit comprises:
- a central processing unit containing a microprocessor operable in response to program instructions;
- input/output means connected for receiving the data and operating commands inputted at said input unit and for supplying data and control signals to said printer unit; and
- memory means for storing the program instructions for said microprocessor and for receiving and storing data received by said input/output means from said input unit and representing at least the monetary value of each document, as well as data received by said input/output means from said optical reader for the same document;

(e) a communication interface for conducting communications with an off-site central location remote from said dispenser and operative to transmit the data stored in said memory means to said central location; and (f) a time keeping device;

inputting data and operating commands via said input unit;

feeding a succession of document forms from said storage receptacle to said document printer and printing readable information on each successive document form, the readable information assigning a monetary value to the document form based on data inputted at the input unit;

storing data representing the monetary value of each document and the cumulative monetary value of a succession of documents in said memory means;

establishing communication between said off-site central location and said communication interface;

periodically transmitting the data stored in the memory means to the central location;

periodically transmitting authorization instructions from the central location to the communication interface; and blocking dispensing of printed documents when no transmission of the data stored in said memory to the central location has occurred for a predetermined period of time or when reception of an authorization instruction from the central location has not occurred for a predetermined period of time.

13. The method according to claim 12, wherein dispensing of printed documents is blocked when the cumulative monetary value exceeds a predetermined value and an authorization instruction to dispense further printed documents has not been received from the central location.

14. The method according to claim 12, further including printing a barcode on each document while inside the dispenser and reading the barcode with said optical reader prior to dispensing.

15. A method for preparing and dispensing documents relating to financial transactions, said method comprising:
   providing a machine comprising:
   (a) a stand-alone, self-contained document dispenser, said dispenser having a housing;
   (b) a manually operable input unit for input of data and operating commands, said input unit being external to and coupled through said dispenser housing;
   (c) a document printer unit for printing readable information, including a monetary value, on document forms based on data inputted at said input unit, wherein said document printer unit is contained entirely within said dispenser housing and comprises:
      a document form storage receptacle for holding the document forms prior to being printed;
      a printer for printing the readable information on the documents to produce completed documents;
      a feed mechanism for feeding the document forms in succession from said receptacle to said printer and for dispensing said completed documents; and
      an optical reader for reading barcode information on said document forms, said reader being operative to verify proper functioning of said printer unit by reading a barcode that is printed on said document forms by said printer inside the dispenser prior to dispensing;
   (d) an internal control unit, wherein said control unit is contained entirely within said dispenser housing and is directly electrically coupled to said input unit and said printer unit for controlling operation of said printer unit in response to data and commands inputted at said input unit, and wherein the control unit comprises:
      a central processing unit containing a microprocessor operable in response to program instructions;
      input/output means connected for receiving the data and operating commands inputted at said input unit and for supplying data and control signals to said printer unit; and
      memory means for storing the program instructions for said microprocessor and for receiving and storing data received by said input/output means from said input unit and representing at least the monetary value of each document, as well as data received by said input/output means from said optical reader for the same document;
   (e) a communication interface for conducting communications with an off-site central location remote from said dispenser and operative to transmit the data stored in said memory means to said central location; and
   (f) a time keeping device;
inputting data and operating commands via said input unit;
providing a plurality of document forms each printed with a bar code;
feeding a succession of document forms from the document form storage receptacle to the document printer and printing readable information on each successive document form based on data inputted at the input unit;
reading the bar code on each document form with said optical reader when the form is in the printer; and
dispensing each form, after printing, from the document printer.

16. The method according to claim 15, further comprising:
   storing in said memory means data representing the monetary value of each document as well as information read by said optical reader for the same document;
   establishing communication between said off-site central location and said communication interface; and
   transmitting the data stored in the memory means to the central location.

17. The method according to claim 15, wherein said readable information is printed on said document forms in the printer with magnetic ink.

18. The method according to claim 15, further including printing a second barcode on each document while inside the dispenser and reading the second barcode with said optical reader prior to dispensing.

19. The method according to claim 18, further comprising:
   storing in said memory means data representing the monetary value of each document as well as information read by said optical reader for the same document;
   establishing communication between said off-site central location and said communication interface; and
   transmitting the data stored in the memory means to the central location.

20. A method for preparing and dispensing documents relating to financial transactions, said method comprising:
   providing a machine comprising:
   (a) a stand-alone, self-contained document dispenser, said dispenser having a housing;
   (b) a manually operable input unit for input of data and operating commands, said input unit being external to and coupled through said dispenser housing;
   (c) a document printer unit for printing readable information, including a monetary value, on document forms based on data inputted at said input unit, wherein said document printer unit is contained entirely within said dispenser housing and comprises:

a document form storage receptacle for holding the document forms prior to being printed;

a printer for printing the readable information on the documents to produce completed documents;

a feed mechanism for feeding the document forms in succession from said receptacle to said printer and for dispensing said completed documents; and an optical reader for reading barcode information on said document forms, said reader being operative to verify proper functioning of said printer unit by reading a barcode that is printed on said document forms by said printer inside the dispenser prior to dispensing;

(d) an internal control unit, wherein said control unit is contained entirely within said dispenser housing and is directly electrically coupled to said input unit and said printer unit for controlling operation of said printer unit in response to data and commands inputted at said input unit, and wherein the control unit comprises:

a central processing unit containing a microprocessor operable in response to program instructions;

input/output means connected for receiving the data and operating commands inputted at said input unit and for supplying data and control signals to said printer unit; and memory means for storing the program instructions for said microprocessor and for receiving and storing data received by said input/output means from said input unit and representing at least the monetary value of each document, as well as data received by said input/output means from said optical reader for the same document;

(e) a communication interface for conducting communications with an off-site central location remote from said dispenser and operative to transmit the data stored in said memory means to said central location; and (f) a time keeping device;

inputting data and operating commands via said input unit;

reading data stored in machine readable form on a data storage medium in a data reader forming part of the input unit;

feeding a succession of document forms from said storage receptacle to said document printer and printing readable information on each successive document form based on data inputted at the input unit and data read in the data reader; and dispensing each form, after printing, from the document printer.

* * * * *